United States Patent
Rosa et al.

(10) Patent No.: US 9,525,526 B2
(45) Date of Patent: Dec. 20, 2016

(54) SIGNALING OF UPLINK SCHEDULING INFORMATION IN CASE OF CARRIER AGGREGATION

(75) Inventors: Claudio Rosa, Randers (DK); Chunli Wu, Beijing (CN); Benoist Pierre Sebire, Tokyo (JP); Frank Frederiksen, Klarup (DK); Klaus Ingemann Pedersen, Aalborg (DK); Troels Emil Kolding, Klarup (DK); Istvan Zsolt Kovacs, Aalborg (DK)

(73) Assignee: Nokia Solutions and Networks Oy, Espoo (FI)

(*) Notice: Subject to any disclaimer, the term of this patent is extended or adjusted under 35 U.S.C. 154(b) by 8 days.

(21) Appl. No.: 14/375,932

(22) PCT Filed: Feb. 2, 2012

(86) PCT No.: PCT/EP2012/051741
§ 371 (c)(1),
(2), (4) Date: Jul. 31, 2014

(87) PCT Pub. No.: WO2013/113390
PCT Pub. Date: Aug. 8, 2013

(65) Prior Publication Data
US 2014/0348105 A1    Nov. 27, 2014

(51) Int. Cl.
*H04L 5/00* (2006.01)
*H04W 72/12* (2009.01)
(Continued)

(52) U.S. Cl.
CPC .............. *H04L 5/003* (2013.01); *H04B 7/024* (2013.01); *H04L 5/001* (2013.01); *H04L 5/0035* (2013.01);
(Continued)

(58) Field of Classification Search
CPC .......... H04B 7/024; H04L 5/001; H04L 5/003; H04L 5/0035; H04L 5/0091; H04L 5/0053; H04W 72/1284; H04W 52/34; H04W 52/365
See application file for complete search history.

(56) References Cited

U.S. PATENT DOCUMENTS 8,811,322 B2 * 8/2014 Feuersanger ......... H04L 5/0007
370/329
2010/0232385 A1   9/2010 Hsu
(Continued)

FOREIGN PATENT DOCUMENTS

EP          2 445 293 A1    4/2012
WO     WO 2010/145508 A1   12/2010
(Continued)

OTHER PUBLICATIONS

3GPP TS 36.321 V10.0.0 (Dec. 2010); 3rd Generation Partnership Project; Technical Specification Group Radio Access Network; Evolved Universal Terrestrial Radio Access (E-UTRA); Medium Access Control (MAC) protocol specification (Release 10).

*Primary Examiner* — Curtis A Alia
(74) *Attorney, Agent, or Firm* — Harrington & Smith

(57) ABSTRACT

An apparatus and a method is provided, by which data is sent to and/or received from a first network control node and at least one second network control node by a carrier aggregation, uplink scheduling information is established and sending of the uplink scheduling information is managed individually for the first network control node and the at least one second network control node.

23 Claims, 2 Drawing Sheets

(51) Int. Cl.
*H04B 7/02* (2006.01)
*H04W 52/36* (2009.01)
*H04W 52/34* (2009.01)

(52) U.S. Cl.
CPC ........ H04L 5/0091 (2013.01); H04W 72/1284 (2013.01); *H04L 5/0053* (2013.01); *H04W 52/34* (2013.01); *H04W 52/365* (2013.01)

(56) References Cited

U.S. PATENT DOCUMENTS

| | | | | |
|---|---|---|---|---|
| 2010/0272091 | A1 | 10/2010 | Fabien et al. | 370/345 |
| 2011/0134774 | A1* | 6/2011 | Pelletier | H04W 52/365 |
| | | | | 370/252 |
| 2011/0310760 | A1* | 12/2011 | Wu | H04W 72/0413 |
| | | | | 370/252 |

FOREIGN PATENT DOCUMENTS

| | | | | |
|---|---|---|---|---|
| WO | WO2011050921 A1 * | 5/2011 | ............ | H04W 72/12 |
| WO | WO 2011/100492 A1 | 8/2011 | | |
| WO | WO2011100492 A1 * | 8/2011 | ............ | H04W 28/08 |
| WO | WO2013025237 A1 * | 2/2013 | ............ | H04W 72/04 |
| WO | WO2013104416 A1 * | 7/2013 | ............ | H04W 28/12 |

\* cited by examiner ns that are also known
as heterogeneous networks (HetNet). In the latest years
heterogeneous networks have become topic of research
activities and extensive work in standardization bodies. One
of the most critical and challenging tasks in heterogeneous
networks is efficient support of mobility. Moreover, traffic
steering between different network layers also becomes an
important task for operators.

Recently, also inter-site CA has been proposed. Inter-site
CA means that a primary cell (PCell) and a secondary cell
(SCell) are transmitted to/received from non-co-sited access
nodes. That is, when applying inter-site CA, a UE is connected to multiple non-collocated eNBs via separate frequency carriers or same frequency. One eNB is controlling
a primary cell (PCell) or primary component carrier, and
possibly one or more secondary cells (SCell) or secondary
component carrier, while the other eNB is controlling one or
more SCells or secondary component carriers.

An example is shown in FIG. 1, in which a UE is
connected to a macro-eNB (a first eNB) and to a pico-eNB
(a second eNB). The macro-eNB is using carrier F1 (PCell
or primary component carrier), whereas the pico eNB is
using carrier F2 (SCell or secondary component carrier).
Between the two eNBs, an interface is provided, which is
usually an X2 interface, and only if the pico eNB should be
a Home eNB, then this is defined as S1. That is, between the
eNBs there is a link (also referred to as backhaul link) via X2
interface or other. Such a link is characterized by high
latency and/or high jitter, which poses a problem for the
above-described inter-site CA.

For scheduling uplink transmission, uplink (UL) scheduling information e.g. Buffer Status Report (BSR) and
Power Headroom Report (PHR) has to be reported from the
UE to the eNB to assist the UL scheduling at the eNB.

However, currently no specific way of supplying such UL
scheduling information from the UE to several eNBs is
provided and should be specified in case of inter-site UL CA
with X2 interface (or similar high latency backhaul link)
between the nodes.

SIGNALING OF UPLINK SCHEDULING INFORMATION IN CASE OF CARRIER AGGREGATION

FIELD OF THE INVENTION

The present invention relates to apparatuses, methods and
a computer program product for signaling of uplink scheduling information in case of carrier aggregation.

RELATED BACKGROUND ART

The following meanings for the abbreviations used in this
specification apply:
ATB Adaptive Transmission Bandwidth
BSR Buffer Status Report
CA Carrier aggregation
CC Component carrier
CoMP Coordinated Multi Point
CQI Channel quality indicator
CRC Cyclic Redundancy Check
DL Downlink
DC Dual carrier
DCI Downlink control information
DL Downlink
eNB enhanced Node-B
E-UTRA Evolved Universal Terrestrial Radio Access
HetNet Heterogeneous networks
HO Handover
HSDPA High speed downlink packet access
L1 Layer 1
L2 Layer 2
LTE Long term evolution
LTE-A LTE-Advanced
MAC Media access control
MUX Multiplex
PCell Primary Cell
PDCCH Physical downlink control channel
PDU Packet data unit
PHR Power headroom report
PUCCH Physical uplink control channel
PUSCH Physical uplink shared channel
RRM Radio resource management
SCell Secondary Cell
TA Timing advance
TAG Timing advance group
UCI Uplink control information
UE User equipment
UL Uplink
U-plane User plane
WCDMA Wideband code division multiple access Embodiments of the present invention relate to LTE
carrier aggregation (CA)/CoMP. In particular, Rel-10 of the
E-UTRA specifications introduces carrier aggregation (CA),
where two or more component carriers (CCs) are aggregated
in order to support wider transmission bandwidths up to 100
MHz. In CA it is possible to configure a UE to aggregate a
different number of CCs originating from the same eNB and
possibly different bandwidths in the uplink (UL) and downlink (DL). In addition, configured CCs can be de-activated
in order to reduce the UE power consumption: the UE
monitoring activity of a de-activated carrier is reduced (e.g.
no PDCCH monitoring and CQI measurements). This
mechanism is referred to as carrier activation/de-activation.

The deployment of low-power eNBs in areas with already
existing macro cell coverage yields cellular systems with
overlapping layers of macro cells and smaller cells (e.g. pico

SUMMARY OF THE INVENTION

Embodiments of the present invention address this situation and aim to provide a reliable way to supply uplink
scheduling information from an UE to corresponding eNBs.

According to a first aspect of the present invention, an
apparatus is provided which comprises a transceiver configured to provide connection to network control nodes, and
a processor configured to send and/or receive data to and/or
from a first network control node and at least one second
network control node via the transceiver by a carrier aggregation, to establish uplink scheduling information and to
manage sending of the uplink scheduling information individually for the first network control node and the at least
one second network control node.

According to a second aspect of the present invention, an
apparatus is provided which comprises a connection unit
configured to provide communication with at least one other
network control node, a transceiver configured to send
and/or receive data to and/or from a user equipment, and a
processor configured to carry out a carrier aggregation in
which data to is transmitted to and/or from a user equipment
via the transceiver and via the at least one other network
control node, wherein the processor is configured to receive
uplink scheduling information from the user equipment via the transceiver and to forward the received uplink scheduling information to the at least one other network control node via the connection unit.

According to a third aspect of the present invention, a method is provided which comprises
sending and/or receiving data to and/or from a first network control node and at least one second network control node by a carrier aggregation,
establishing uplink scheduling information and
managing sending of the uplink scheduling information individually for the first network control node and the at least one second network control node.

According to a fourth aspect of the present invention, a method is provided which comprises
sending and/or receiving data to and/or from a user equipment, by carrying out a carrier aggregation with at least one other network control node,
receiving uplink scheduling information from the user equipment and
forwarding the received uplink scheduling information to the at least one other network control node.

Advantageous developments are set out in the dependent claims.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

However, before describing some embodiments in detail, it is again referred to the problem underlying the present application. As mentioned above, embodiments of the present invention relate to providing uplink (UL) scheduling information, i.e., uplink L2 scheduling information feedback/transmission from the UEs, such as a CC-specific power headroom report (PHR) and a buffer status report (BSR), in particular when considering that the link between eNBs (X2 interface or other) might have high latency and/or high jitter.

Both PHR and BSR are MAC CE (control element) messages transmitted on the PUSCH and are terminated at MAC i.e., in the access node where PUSCH is received. Both PHR and BSR messages are independent of each other and are triggered by different conditions, and can either be sent periodically or sent when given conditions at the UE are fulfilled. The exact configurations and actions for these are defined in 36.321 sections 5.4.5 and 5.4.6. In Rel-10 CA framework it is not standardized on which cell PHR and BSR should be transmitted in case PUSCH is available on both PCell and SCell. One PHR is transmitted for each configured CCs, while only one BSR is transmitted corresponding to all active CCs. The BSR will be triggered according to certain configurations and will report information on remaining amount of data in the certain UE logical buffer after successful transmission of the current PUSCH (i.e. buffer state information is not CC-specific).

In the case when the PCell and SCell are co-sited, the actual cell used for the transmission of the PHRs and BSR is not critical. However, in the inter-site CA case when the SCell is non-co-sited with the PCell (and therefore uplink radio resource management for the PCell and SCell is done independently at the corresponding access nodes), power headroom and buffer state information need to be used at both PCell and SCell. Therefore the UE needs to be configured with a suitable PUSCH signaling format/mode, as well as UE behavior need to be clearly standardized on which serving cell(s) to transmit the PHR and BSR.

In order to solve the above problem, according to certain embodiments of the present invention, transmitting of uplink scheduling information, e.g., BSR/PHR triggers, are managed at the UE individually for each scheduler (e.g., for each PCell and SCell).

Figure 2:
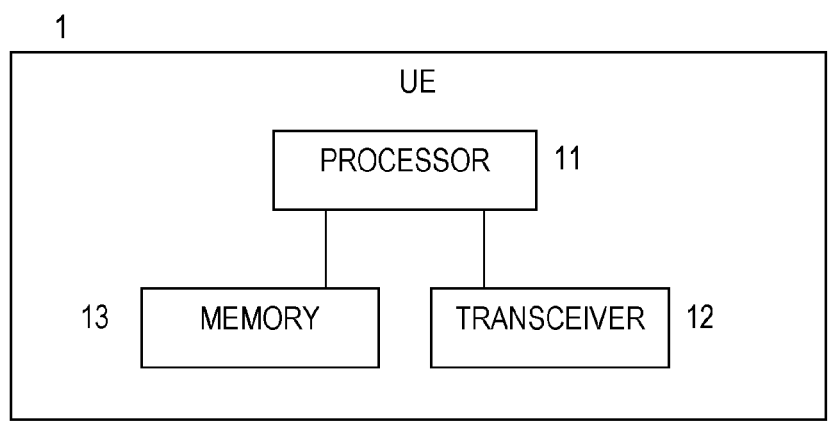
FIG. 2 shows an example for a UE according to an embodiment of the present invention.

FIG. 2 shows an UE 1 as an example for an apparatus (which may be a user equipment or a part thereof) according to a more general embodiment of the present invention. The UE 1 comprises a transceiver 12 configured to provide connection to network control nodes, and a processor 11 configured to send and/or receive data to and/or from a first network control node and at least one second network control node via the transceiver 12 by a carrier aggregation, and to establish uplink scheduling information and to manage sending of the uplink scheduling information individually for the first network control node and the at least one second network control node.

The UE may also comprise a memory 13 for storing data and programs, by means of which the processor 11 may carry out its corresponding functions.

For example, the first network control node may be a macro-eNB (PCell), and the second network control node may be a pico-eNB (SCell).

In the carrier aggregation mentioned above data is transmitted via at least two serving cells (e.g., PCell and SCell) to and/or from the first network control node and the at least one second network control node. The connections on PCell and SCell may also be referred to as component carriers.

Thus, according to this embodiment, by individually managing sending of UL scheduling information (such as BSR/PHR triggers), the necessary UL scheduling information is reliably provided to the corresponding eNBs.

It is noted that the procedure described above is not only applicable for BSR/PHR triggers, but also to BSR/PHR cancellations.

For instance, BSR/PHR triggers as such could remain unchanged but the cancellation could be done individually for each cell (or site) to ensure that once triggered, a BSR or PHR is sent to both and with the latest value always.

The UE may also detect whether cells (PCell and SCell) are from the same site or not. One possible way for the UE to know which cells are from the same site and managed by the same scheduler would be to rely on the Timing Advance Group (TAG) introduced for Rel-11 i.e. the UE assumes the cells within the same TAG are from same site, hence maintains BSR/PHR trigger per TAG. Another possibility would be to explicitly configure which serving cells should have separate UL scheduling information, or on which serving cells the UE should send UL scheduling information.

In order to ensure that no triggers remain unnecessarily pending, the activation status could be taken into account: for instance when no SCell in a site are active, the corresponding triggers could be automatically cancelled.

Also, the procedure described above could be limited to certain types of triggers e.g. periodic BSR only.

Thus, according to the embodiments as described above, when there are independent schedulers (e.g., separate eNBs) located in different sites, it is ensured that all sites can obtain the latest UL scheduling information for scheduling.

In the following, a further detailed embodiment of the present invention is described by referring to FIG. 3, which illustrates L2 UL signaling and inter-node information exchange between PCell and (non-co-sited) SCell according to the embodiment.

In particular, in order to support independent per-CC uplink RRM with inter-site CA (non-co-sited CCs), according to the present embodiment uplink L2 scheduling information is provided separately on a CC basis. The "SCell" in the following description of the present embodiment refers to a non-co-sited SCell or a group of non-co-sited SCells. In the following, the eNB or node which operates the PCell is also referred to a master node, whereas the eNB or node operating the SCell is also referred to as slave node. It is noted that principle the master node can also operate one or more SCells (besides of the PCell), while the slave node is only operating one or more SCells.

Figure 3:
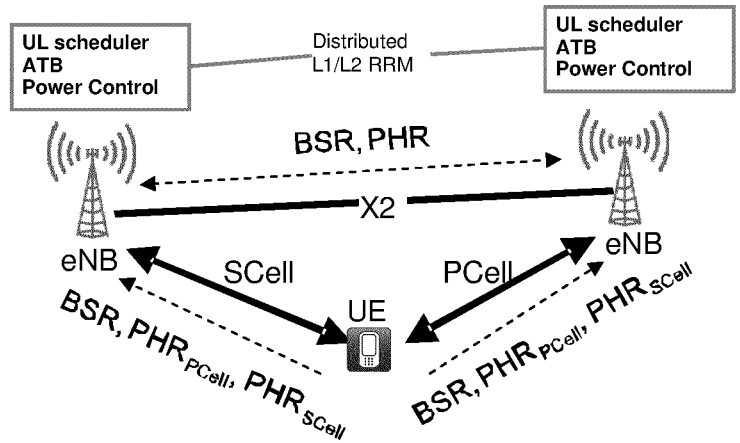
FIG. 3 shows a L2 UL signaling and inter-node information exchange between PCell and (non-co-sited) SCell according to an embodiment of the present invention.

FIG. 3 illustrates Layer-2 (L2) UL signaling and inter-node information exchange between a PCell and a (non-co-sited) SCell according to an embodiment. The working assumption here is that the UE terminals support multi-band (multi CC) transmission in UL and reception in DL although not necessarily the same number of UL and DL CCs are used. (However, in principle UL transmission to multiple nodes could also be possible with terminals only supporting single-carrier transmission.) The X2 interface between the master and slave nodes is assumed to be used to allow for the distributed L1/L2 RRM.

In the following, some more detailed embodiments are described by specifying BSR and PHR transmissions. The following cases apply when the UE has PUSCH allocation on both PCell and SCell, but could also applicable to the case where UE has only one allocation on either PCell or SCell.

In the following, three different example cases for BSR transmission are described.

According to a first case for the BSR transmission, BSR may always be transmitted on both PCell and SCell, in case both are scheduled. Thus, no BSR information exchange is required between the nodes controlling the PCell and SCell. Furthermore, preferably sufficient PUSCH capacity should be scheduled on both PCell and SCell. Alternatively the UE could send BSR on the allocated PUSCH (as done in Rel-10) but have BSR cancelation done on a CC basis, i.e. BSR for a given serving cell is considered pending until it is not transmitted on the corresponding cell. Furthermore, in this first case for the BSR transmission, signaling delays on the link between the eNBs (interface X2 or other) would have no or minimal impact.

According to a second case for the BSR transmission, the UE may decide if BSR is transmitted on PCell or SCell. In this case, the (master) PCell has to be able to periodically exchange the BSR information with the SCell. Furthermore, signaling delays on the link between the eNBs might lead to scheduling of PCell or SCell UL resources which will not be used by the UE.

According to a third case for the BSR transmission, BSR may always be transmitted on PCell only. In this case, the (master) PCell has to be able to periodically forward the BSR information to the SCell. Furthermore, similar as in the second case, signaling delays on X2 can potentially lead to scheduling of SCell UL resources which will not be used by the UE. Furthermore, the PCell needs to periodically allocate PUSCH resources on PCell to ensure that UE is able to transmit BSR.

In the following, three different example cases for PHR transmission are described.

According to a first case for the PHR transmission, PHR may always transmitted on both PCell and SCell. That is, according to a first alternative, $PHR_{PCell}$ for PCell and $PHR_{SCell}$ for the SCell are always transmitted on both PCell and SCell. That is, PCell receives $PHR_{PCell}$ and $PHR_{SCell}$ and the SCell receives $PHR_{PCell}$ and $PHR_{SCell}$. This is advantageous in that then both nodes controlling PCell and SCell know PHR in all cases. As a further alternative, $PHR_{PCell}$ is sent to PCell only and $PHR_{SCell}$ is sent to SCell only. This can be sufficient, for example, if "TDD-based" solution is applied in uplink (i.e. some subframes are for PCell/macro transmission and other subframes are for SCell/pico transmission).

In this case, minimal PHR related information exchange is required between the PCell and SCell e.g. for the master node to be able to detect those UEs having troubles with dual-UL transmission and/or to indicate to SCell a maximum power budget to be used for UL scheduling. Signaling delays on X2 have no or minimal impact in case PCell and SCell schedulers have agreed actions in case UE comes close to power limitation (potentially forcing the PCell or SCell to back off in terms of allocating data). Furthermore, also in this case PHR cancelation mechanism could be per CC, i.e. a PHR is considered pending (on a given serving cell) until it is not transmitted on the corresponding cell.

According to a second case for the PHR transmission, $PHR_{PCell}$ and $PHR_{SCell}$ may be transmitted only to PCell. That is, the inter-node signaling between the PCell and SCell has to include the periodic exchange of the $PHR_{PCell}$ and $PHR_{SCell}$. In this case, signaling delays on X2 may lead to temporally incorrect power settings at the UE (UL PC) and/or erroneous reception at the access nodes.

According to a third case for the PHR transmission, the UE may decide/select to which node to send the $PHR_{PCell}$ and $PHR_{SCell}$. In this case, the inter-node signaling between the PCell and SCell should include a periodic exchange of the $PHR_{PCell}$ and $PHR_{SCell}$. Preferably, the UE should be restricted or configured to be able to select only once the node to send the $PHR_{PCell}$ and $PHR_{SCell}$ to. In this third case for the PHR transmission, signaling delays on X2 may lead to temporally incorrect power settings at the UE (UL PC) and/or erroneous reception at the access nodes.

Furthermore, optionally CC-specific PHR triggering (including periodic PHR) may be introduced, since with the proposed inter-site CA concept a UE can experience significant path loss difference between PCell (macro) and SCell (micro, pico or femtocell).

Thus, an actual implementation of embodiments of the present invention can be carried out by taking into account the above described advantages and disadvantages for the different cases.

The following points may be considered for implementations of the embodiments described above:

Though BSR and PHR are decoupled and therefore different strategies can in principle be used, according to a preferred implementation of the above embodiments of the invention the same policy is used for BSR and PHR.

BSR and PHR may be configured to be reported on both PCell and SCell. This can be implemented e.g. by having similar triggering mechanisms as in Rel-10 but having BSR/PHR cancelation on a CC basis (i.e. a PHR/BSR is considered pending until being transmitted on the corresponding CC). Alternatively, new (CC-specific) triggering mechanisms could be introduced to e.g. take into consideration the potentially significant path loss difference experienced on different CCs.

Some signaling on X2 interface may be standardized to allow a master network control node (i.e. the eNB controlling the PCell, e.g. macro-eNB shown in FIG. 3) and slave network control node (i.e. eNB controlling the SCell, e.g., pico-eNB shown in FIG. 3) to exchange information on the available power budget at each node. That is, the master network control node could indicate to the slave network control node the maximum power budget for a given UE on the corresponding SCell, for example.

Figure 4:
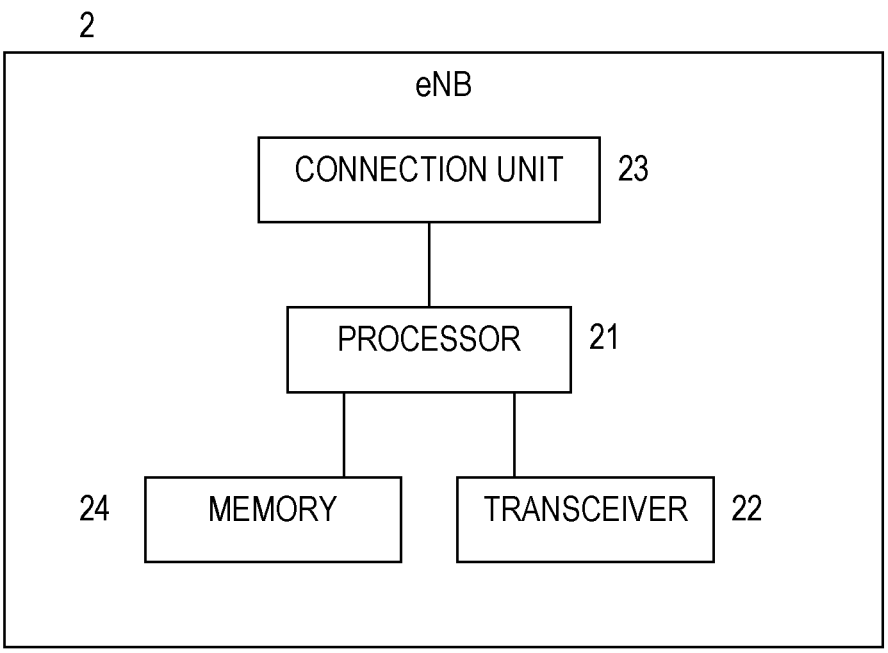
FIG. 4 shows an example for an eNB according to an embodiment of the present invention.

FIG. 4 shows an eNB 2 as an example for an apparatus (which may be a network control element such as an eNB or a part thereof) according to a more general embodiment of the present invention. The eNB 2 comprises a connection unit 23 configured to provide communication with at least one other network control node, a transceiver 22 configured to send and/or receive data to and/or from a user equipment, and a processor 21. The processor 21 is configured to carry out a carrier aggregation in which data to is transmitted to and/or from a user equipment via the transceiver and via the at least one other network control node. The processor 21 is further configured to receive uplink scheduling information from the user equipment via the transceiver 23 and to forward the received uplink scheduling information to the at least one other network control node via the connection unit 22.

The above eNB may be configured to operate either as a PCell or SCell. That is, for example both the pico-eNB and the macro-eNB shown in FIGS. 1 and 3 may be structured as described above.

The eNB 2 may also comprise a memory 23 for storing data and programs, by means of which the processor 21 may carry out its corresponding functions.

The connection unit may be configured to provide a connection to another network control element via an X2 interface, as described above.

Thus, according to the embodiments as described above, the following advantages can be achieved:

By the measures it is ensured that relevant L2 uplink scheduling information is available at the nodes controlling the different serving cells from a given UE.

Moreover, it is possible to use fast scheduling of UL resources with limited additional UL overhead It is noted that the embodiments and the present invention in general are not limited to the specific examples given above.

Figure 1:
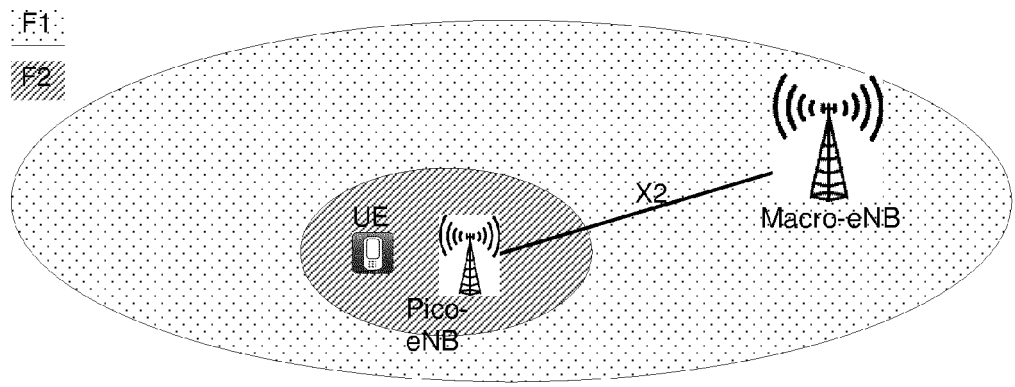
FIG. 1 shows an example for heterogeneous network scenario in which a macro-eNB and a pico-eNB are connected to a user equipment (UE)

In the above embodiments, a case was described that the eNB controlling the PCell (also referred to as master network control node) is a macro-eNB, i.e., the base station which controls the larger cell as shown in FIG. 1. However, the invention is not limited to this, and it is possible that also a pico-eNB, i.e., a base station which controls the smaller cell, could control the PCell, whereas the macro-eNB controls the SCell. Furthermore, both network control nodes (base stations) could be equal. For example, two eNB could work together in an overlapping area of the cells, in which the UE is located. That is, one the eNBs would then be the macro eNB as described above, and the other eNB would be the pico eNB.

Moreover, the nodes described above as eNBs and/or macro and pico-eNBs are not limited to these specific examples and can be any kind network control node (e.g., a base station) which is capable of transmitting via component carriers to a user equipment.

Furthermore, BSR and PHR described above are only examples for uplink scheduling information, and also other kind of uplink scheduling information may be provided.

Thus, according to an aspect of embodiments of the present invention, an apparatus and a method are provided by which data is sent to and/or received from a first network control node and at least one second network control node by a carrier aggregation, uplink scheduling information is established and sending of the uplink scheduling information is managed individually for the first network control node and the at least one second network control node.

According to another aspect of embodiments of the present invention an apparatus is provided which comprises
  means for sending and/or receiving data to and/or from a first network control node and at least one second network control node by a carrier aggregation,
  means for establishing uplink scheduling information and
  means for managing sending of the uplink scheduling information individually for the first network control node and the at least one second network control node.

According to a further aspect of embodiments of the present invention, an apparatus is provided which comprises
  means for sending and/or receiving data to and/or from a user equipment, by carrying out a carrier aggregation with at least one other network control node,
  means for receiving uplink scheduling information from the user equipment and
  means for forwarding the received uplink scheduling information to the at least one other network control node.

It is to be understood that any of the above modifications can be applied singly or in combination to the respective aspects and/or embodiments to which they refer, unless they are explicitly stated as excluding alternatives.

For the purpose of the present invention as described herein above, it should be noted that
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the invention in terms of the functionality implemented;
  method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
at least one processor; and
at least one memory including computer program code, where the at least one memory and the computer program code are configured, with the at least one processor, to cause the apparatus to:
provide connection to network control nodes;
at least one of send and receive data at least one of to and from a first network control node and at least one second network control node via a transceiver by a carrier aggregation;
establish uplink scheduling information;
detect whether the first network control node and the at least one second network control node belong to a same site by detecting whether the first network control node and the at least one second network control node belong to a same timing advance group; and
based on detecting that the first network control node and the at least one second network control node do not belong to a same site, sending of the uplink scheduling information for the first network control node and the at least one second network control node, wherein the uplink scheduling information is triggering and cancelling uplink scheduling at one of the first network control node and the at least one second network control node independent of another one of the first network control node and the at least one second network control node.

2. The apparatus according to claim 1, wherein the uplink scheduling information comprises buffer status report and power headroom report scheduling information and wherein the uplink scheduling information is cancelling a trigger corresponding to a buffer status report and a power headroom report at one of the first network control node and the at least one second network control node.

3. The apparatus according to claim 1, wherein the at least one memory including the computer program code comprises configuration information about which of the first network control node and the at least one second network control node should receive separate uplink scheduling information or to which of the first network control node and the at least one second network control node it should send the uplink scheduling information.

4. The apparatus according to claim 1, wherein the at least one memory including the computer program code is configured with the at least one processor to cause the apparatus to detect whether in a particular site no network control node is active and to cancel sending of the uplink scheduling information for this particular site when no network control node is active.

5. The apparatus according to claim 1, wherein the uplink scheduling information is a periodic uplink scheduling information.

6. The apparatus according to claim 1, wherein the at least one memory including the computer program code is configured with the at least one processor to cause the apparatus to at least one of:
send the uplink scheduling information to both the first network control node and the at least one second network control node via the transceiver,
decide whether the uplink scheduling information is to be sent to the first network control node or to the at least one second network control node, and
send the uplink scheduling information only to the first network control node.

7. The apparatus according to claim 1, wherein
the first network control node is a master network control node in the carrier aggregation which is configured to control the carrier aggregation.

8. The apparatus according to claim 1, wherein the uplink scheduling information comprises at least one of a buffer status report and a power headroom report.

9. An apparatus comprising:
at least one processor; and
at least one memory including computer program code, where the at least one memory and the computer program code are configured, with the at least one processor, to cause the apparatus to:
provide communication with at least one other network control node;
at least one of send and receive data at least one of to and from a user equipment;
carry out a carrier aggregation in which data is at least one of transmitted to and from a user equipment via the at least one other network control node;
receive uplink scheduling information from the user equipment, wherein the uplink scheduling information is sent to a first network control node and the at least one other network control node, and wherein the scheduling information is triggering and cancelling uplink scheduling at one of the first network control node and the at least one other network control node independent of another one of the first network control node and the at least one other network control node; and forward the received uplink scheduling information to the first network control node and the at least one other network control node.

10. The apparatus according to claim 9, wherein
the at least one memory including the computer program code is configured with the at least one processor to cause the apparatus to decide whether and to which other network control node the uplink scheduling information is to be forwarded based on at least one of a network configuration and on information of the user equipment indicating to which network control node the user equipment sends the uplink scheduling information.

11. The apparatus according to claim 9, wherein the at least one memory including the computer program code is configured with the at least one processor to cause the apparatus to forward the uplink scheduling information to the first network control node and the at least one other network control node periodically.

12. A method comprising
at least one of sending and receiving data at least one of to and from a first network control node and at least one second network control node by a carrier aggregation;
establishing uplink scheduling information comprising uplink scheduling triggering information and uplink scheduling cancelling information;
detecting whether the first network control node and the at least one second network control node belong to a same site by detecting whether the first network control node and the at least one second network control node belong to a same timing advance group; and
based on detecting that the first network control node and the at least one second network control node do not belong to a same site, managing sending of the uplink scheduling information for the first network control node and the at least one second network control node, wherein the uplink scheduling information is triggering and cancelling uplink scheduling at one of the first network control node and the at least one second network control node independent of another one of the first network control node and the at least one second network control node.

13. The method according to claim 12, wherein the uplink scheduling information comprises buffer status report and power headroom report scheduling information and wherein the uplink scheduling cancelling information is cancelling a trigger corresponding to a buffer status report and a power headroom report at the one of the first network control node and the at least one second network control node.

14. The method according to claim 12, wherein configuration information is provided which informs about which of the first network control node and the at least one second network control node should receive separate uplink scheduling information or to which of the first network control node and the at least one second network control node the uplink scheduling information is to be sent.

15. The method according to claim 12, further comprising
detecting whether in a particular site no network control node is active and
cancelling sending of the uplink scheduling information for this particular site when no network control node is active.

16. The method according to claim 12, wherein the uplink scheduling information is a periodic uplink scheduling information.

17. The method according to claim 12, further comprising
sending the uplink scheduling information to both the first network control node and the at least one second network control node, or
deciding whether the uplink scheduling information is to be sent to the first network control node or to the at least one second network control node, or
sending the uplink scheduling information only to the first network control node.

18. The method according to claim 12, wherein
the first network control node is a master network control node in the carrier aggregation which is configured to control the carrier aggregation.

19. The method according to claim 12, wherein the uplink scheduling information comprises at least one of a buffer status report and a power headroom report.

20. A computer program product embodied on a non-transitory computer-readable medium comprising code executed by at least one processor to perform the method according to claim 12.

21. An method comprising
at least one of sending and receiving data at least one of to and from a user equipment, by carrying out a carrier aggregation with at least one other network control node;
receiving information triggering uplink scheduling information from the user equipment, wherein the uplink scheduling information is sent to a first network control node of and the at least one other network control node, and wherein the scheduling information is triggering and cancelling uplink scheduling at one of the first network control node and the at least one other network control node independent of another one of the first network control node and the at least one other network control node; and
forwarding the received uplink scheduling information and the information cancelling uplink scheduling to the first network control node and the at least one other network control node.

22. The method according to claim 21, further comprising
deciding whether and to which other network control node the uplink scheduling information is to be forwarded at least one of based on a network configuration and based on information of the user equipment indicating to which network control node the user equipment sends the uplink scheduling information.

23. The method according to claim 21, further comprising
forwarding the uplink scheduling information to the first network control node and the at least one other network control node periodically.

* * * * *